United States Patent
Li et al.

(10) Patent No.: US 9,594,400 B2
(45) Date of Patent: Mar. 14, 2017

(54) ELECTRONIC DEVICE

(71) Applicant: Lenovo (Beijing) Co., Ltd., Beijing (CN)

(72) Inventors: Fenglang Li, Beijing (CN); Peng Bai, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 17 days.

(21) Appl. No.: 14/726,936

(22) Filed: Jun. 1, 2015

(65) Prior Publication Data
US 2016/0170449 A1   Jun. 16, 2016

(30) Foreign Application Priority Data
Dec. 15, 2014   (CN) .......................... 2014 1 0776129

(51) Int. Cl.
*G06F 1/16*   (2006.01)
(52) U.S. Cl.
CPC .......... *G06F 1/1616* (2013.01); *G06F 1/1662* (2013.01)
(58) Field of Classification Search
CPC ............................ G06F 1/1616; G06F 1/1662
USPC .................... 361/679.14, 679.09, 679.08
See application file for complete search history.

(56) References Cited

U.S. PATENT DOCUMENTS

| | | | | |
|---|---|---|---|---|
| 6,976,799 | B2 * | 12/2005 | Kim ...................... | G06F 1/1618 361/679.09 |
| 7,755,883 | B2 * | 7/2010 | Hsu ...................... | F16B 37/043 312/223.1 |
| 8,310,823 | B2 * | 11/2012 | Stoltz .................... | G06F 1/1616 361/679.08 |
| 2003/0021082 | A1 * | 1/2003 | Lu ......................... | G06F 1/1616 361/679.4 |
| 2008/0084396 | A1 * | 4/2008 | Pen ....................... | G06F 1/1616 345/168 |
| 2009/0201254 | A1 * | 8/2009 | Rais ...................... | G06F 1/1613 345/168 |
| 2013/0016467 | A1 * | 1/2013 | Ku ......................... | F16M 11/10 361/679.08 |

* cited by examiner

*Primary Examiner* — Tuan T Dinh
*Assistant Examiner* — Rockshana Chowdhury
(74) *Attorney, Agent, or Firm* — Brinks Gilson & Lione; G. Peter Nichols

(57) ABSTRACT

An electronic device includes a main body and an input body. The main body has a display unit and a first contact portion rotatably connected to the display unit. The first contact portion has a first surface and a second surface opposite to the first surface, and at least one part of the first contact portion has a thickness smaller than a thickness of the display unit. The input body includes a second contact portion with a contact surface. When the input body is detachably connected to the main body, the display unit is operable to rotate with respect to the input body, and the contact surface of the second contact portion is operable to engage with the first or second surfaces of the first contact portion by surface-to-surface contacting.

15 Claims, 3 Drawing Sheets

ELECTRONIC DEVICE

This application claims priority to Chinese Patent Application No. 201410776129.1 filed on Dec. 15, 2014, the entire contents of which are incorporated herein by reference.

BACKGROUND

The present disclosure relates to a field of an electronic product or device, such as a field of laptop or pad computer.

With the development of touch technology, touch products are more used in work and life. Current touch products, such as pad computers, do not have physical keyboard due to touch screen input. However, when the user needs to do a lot of typing work, touch screen input is relatively inefficient, and therefore, there is a demand to provide a pad computer with a physical keyboard.

However, on the other hand, when the pad computer is provided with a physical keyboard, the computer becomes physically similar to a traditional fold-style laptop, and in this case, when people do not need a lot of typing work, i.e., the physical keyboard is not needed, the keyboard will become a burden to carry.

Therefore, there is a demand for a new type of an electronic device, which has a main body such as a conventional pad computer and an input body such as a physical keyboard that can be detachably assembled together. The user can assemble or separate the two parts as needed, and the product can be used similar to a traditional fold-type laptop after the two parts having been assembled together, or can be used similar to a traditional pad computer after the two parts having been separated.

Further, there is a demand for the assembling so that the connection between the main body and the input body should be easy to operate, and the connection should be firm, otherwise it will affect the reliability.

As for the separating, it is desired that after separated the main body, i.e. the pad computer part, has a support so that the pad computer can be supported at an angle on the platform, for facilitating the user watching videos without holding the pad by hand. In prior art, this is achieved by using an additional separate support member so that the pad computer can stand with the help of the support member when the user is watching videos. However, it is not convenient to always carry such an extra support member, and awkward situation happens when the support member is forgotten to carry.

Therefore, it is desirable to provide a product or device which can solve at least one or more above-mentioned problems.

SUMMARY

According to an aspect, the embodiments of the present disclosure provide an electronic device, comprising: a main body, which comprises a display unit and a first contact portion rotatably connecting to the display unit, the first contact portion comprises a first surface and a second surface opposite to the first surface, and at least one part of the first contact portion has a thickness smaller than a thickness of the display unit; and an input body, which comprises a second contact portion with a contact surface. In the case that the input body detachably connecting to the main body, the display unit is operable to rotate with respect to the input body, and the contact surface of the second contact portion is operable to engage with the first or second surfaces of the first contact portion by surface-to-surface contacting.

Optionally, when the first contact portion is engaged with the second contact portion, a thickness of overlapping parts of the first and second contact portions is smaller than or equal to the thickness of the display unit.

Optionally, the first contact portion is connected to the display unit by a rotating connector.

Optionally, in a direction perpendicular to rotating axis of the rotating connector, the first contact portion has a length shorter than that of the display unit.

Optionally, the first contact portion is operable to support the main body on a supporting platform if the input body detached from the main body.

Optionally, the input body is operable to support the electronic device on a supporting platform if the input body is assembled to the main body.

Optionally, the input body is operable to rotate with respect to the main body at 0-360 degree Optionally, when the input body is assembled to the main body, the input body is operable to rotate with respect to the main body at a predefined angle, so that the input body is lying on a supporting platform to support the electronic device, or an edge of the input body and an edge of the main body are contacting the supporting platform to support the electronic device.

Optionally, the cross section of the first contact portion perpendicular to the rotating axis thereof is wedge-shaped.

Optionally, the cross section of the second contact portion is wedge-shaped, the cross section of the second contact portion is a cross section cut in a direction perpendicular to the rotating axis of the first contact portion when the input body is assembled to the main body.

Optionally, the second contact portion is an edge portion of a housing of the input body.

Optionally, the electronic device further comprises a positioning hole formed on the first contact portion and a positioning projection formed on the second contact portion, the positioning projection is operable to insert into the positioning hole to fix the input body with the main body.

Optionally, the positioning hole is formed as an elongated through-hole, and the positioning projection is formed into two positioning posts with adjustable spacing, the spacing between the two positioning posts is reduced so that the two positioning posts are operable to insert into the elongated through-hole, and the spacing is increased thereafter so that the two positioning posts are locked onto two ends of the elongated through-hole respectively.

Optionally, the electronic device further comprises a spring attached to the positioning posts to automatically increase the spacing between the two positioning posts after the two positioning posts are inserted into the positioning hole.

Optionally, the main body is a tablet computer and the input body is a keyboard.

According to another aspect, the embodiments of the present disclosure provide an electrical device having a main body, the main body comprises: a display unit; and a first contact portion coupled to the display unit and operable to rotate with respect to the display unit, the first contact portion comprises a first surface and a second surface opposite to the first surface, at least one part of the first contact portion has a thickness smaller than a thickness of the display unit. The first or second surface of the first contact portion is configured to detachably engage with a contact surface of a second electronic device by surface-tosurface contacting, and the first contact portion is operable to support the electronic device on a supporting platform.

DETAILED DESCRIPTION

Figure 1:
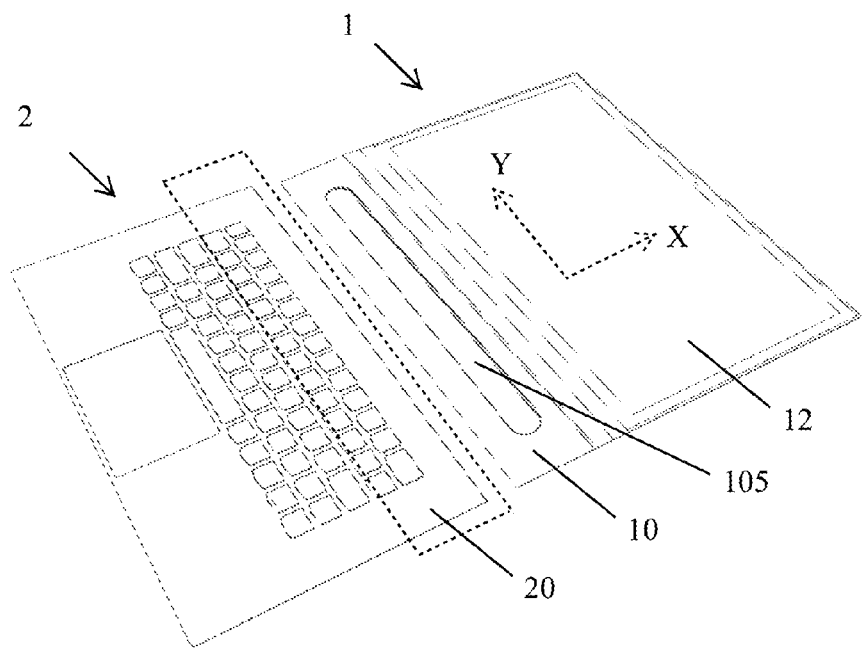
FIG. 1 is a schematic view illustrating an electronic device according to an embodiment of the present disclosure, wherein the main body and the input body of the electronic device are detached.

Above-mentioned and other technical solutions, features and advantages of the present disclosure will become apparent from the detailed description hereinafter in conjunction with accompanying drawings. The terms, such as "on," "under," "left," "right," "front," "back," or the like, which are used in embodiments hereinafter, are used to indicate directions of drawings. Therefore, these direction terms are for illustration purposes and are not intended to limit the present disclosure. Also, same reference numbers indicate same elements.

Various exemplary embodiments of the present disclosure will be described hereinafter referring to the drawings.

Referring first to FIG. 1, which is a schematic view illustrating an electronic device according to a preferred embodiment of the present disclosure, wherein the main body and the input body of the electronic device are in a completely separated state. As shown in FIG. 1, the electronic device according to this embodiment includes a main body 1 and the input body 2 that can be detachably assembled together. In this embodiment, the main body is exemplarily a pad computer that can be used independently, and the input body 2 is exemplarily a traditional physical QWERTY keyboard, so that when the main body 1 and the input body 2 are separated, the main body 1 can be used alone as a pad computer, while when the main body 1 and the input body 2 are assembled together, the electronic device is similar to a conventional folding type laptop, but a processing unit such as CPU is located in the main body 1 instead of in a housing below the keyboard. However, it should be noted that the present disclosure is not limited thereto, e.g., the main body may be any touch device, the input body 2 may, for example, be an input keyboard of other forms.

Continuing to refer to FIG. 1, the main body 1 comprises a display unit 12, and a first contact portion 10 connected to the display unit 12 by a rotating connector such as a pivotal connector (in FIG. 1 the rotating connector is covered by a casing and therefore not directly visible) so as to rotate with respective to the display unit 12. The input body 2 has a second contact portion 20 to be engaged with the first contact portion 10, and in this embodiment, the second contact portion is an edge part (see the part in the dashed rectangle in FIG. 1) of the casing of the input body 2. Preferably, in this embodiment, the first contact portion 10 can rotate 0-360 degrees with respect to the display unit 12, accordingly, when the input body 2 is assembled to the main body 1, the input body 2 can rotate 0-360 degrees with respect to the main body 1. Thus, it is possible to support the electronic device on the support platform, with for example the input body 2 lying on the support platform with its whole part (i.e. like a traditional laptop opened) or with the product standing on the support platform by one edge of the input body 2 and one edge of the display unit 12 (i.e. like the shape of a tent), by rotating the input body 2 to certain angle with respect to the main body 1.

Figure 2:
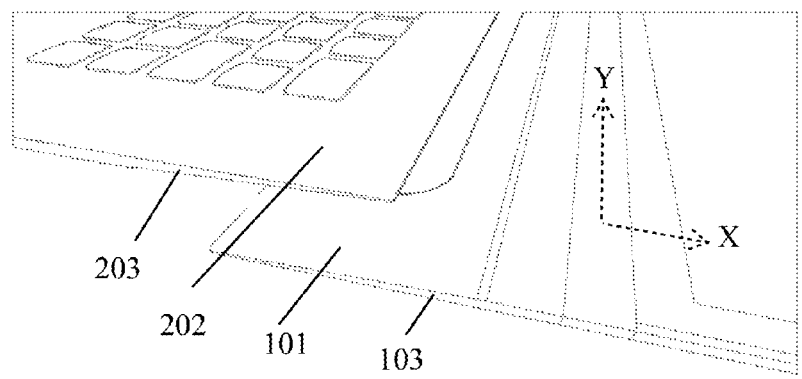
FIG. 2 is a partial enlarged view of the electronic device shown in FIG. 1, wherein the main body and the input body of the electronic device are in a state of being overlapped but not contacted with each other.

Referring now to FIG. 2, which is a partial enlarged schematic view of the electronic device shown in FIG. 1, wherein the main body and the input body of the electronic device are in a state of being overlapped but not contacted with each other. As shown in FIG. 2, the first contact portion 10 has a first surface 101 functioned as an contact surface and a second surface 102 (not visible in FIG. 2, see the second surface 102 in FIG. 4) opposite to the first surface 101, and the second contact portion 20 has a first surface functioned as an contact surface (not visible in FIG. 2) and a second surface 202 opposite to the first surface. When the main body 1 and the input body 2 is detachably assembled together, the contact surface (the first surface 101 in FIG. 2) of the first contact portion 10 engages with the contact surface (the first surface opposite to the second surface 202 in FIG. 2) of the second contact portion 20 in a manner of surface-to-surface contacting. Surface-to-surface contacting may increase the area of engagement, thereby facilitating stable connection between the first and second contact portion. It is noted that, in the exemplary embodiment shown in FIG. 2, the second contact portion 20 is located above the first contact portion 10 after engaging, however, alternatively, in other embodiments, it is possible that the first contact portion 10 is located above the second contact portion 20 after engaging.

Figure 3:
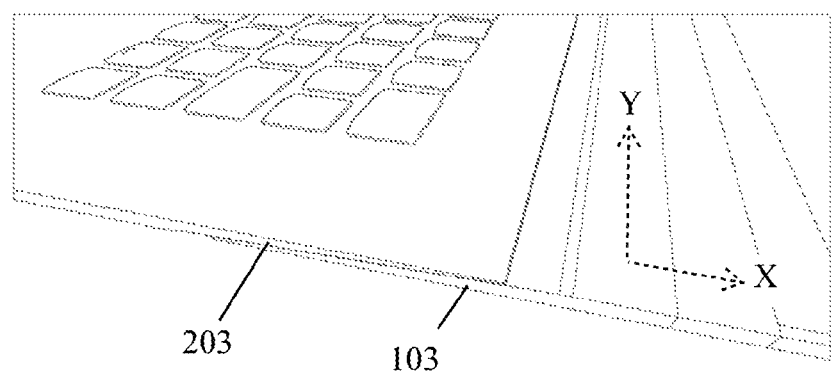
FIG. 3 is a partial enlarged view of the electronic device shown in FIG. 1, wherein the main body and the input body of the electronic device are in a state of being engaged with each other.

Further referring to FIG. 2, as can be seen from this figure, in this embodiment, at least a part (left part in FIG. 2) of the first contact portion 10 has the thickness smaller than the thickness of the display unit 12. Further preferably, referring to FIG. 3, which is a partial enlarged schematic view of the electronic device shown in FIG. 1, wherein the main body and the input body of the electronic device are engaged together, and after the first contact portion 10 is engaged with the second contact portion 20, the total thickness of the overlapped parts of these two is smaller than or equal to the thickness of the display unit 12, thereby in the present disclosure product thickness will not be disadvantageously increased due to said engagement. As used herein, "thickness" refers to, when the first contact portion 10 rotates with respect to the display unit 12 till both of them are located in the same plane or parallel to each other, in particular, till that the first or second surface of the first contact portion 10 (e.g. the second surface in FIG. 2) and the back face of the display unit 12 (what invisible in FIG. 2 is the display face of the display unit) are located in the same plane or parallel to each other, a dimension measured in a direction perpendicular to the display face of the display unit, i.e. a dimension measured in a direction perpendicular to the plane XY in the figure.

Further, in the foregoing preferred embodiments of the present disclosure, preferably, as shown in FIG. 1 or 2, the length of the first contact portion 10 is smaller than the length of the display unit 12, e.g., about one third, it is therefore good for the first contact portion to function as a support for the display unit 12, such that the main body 1, when used alone as a pad computer, can realize stable self-standing/self-supporting. As used herein, "length" refers to, when the first contact portion 10 rotates with respect to the display unit 12 till both of them are located in the same plane or parallel to each other, in particular, till that the first or second surface of the first contact portion 10 (e.g. the second surface in FIG. 2) and the back face of the display unit 12 are located in the same plane or parallel to each other, a dimension measured in a direction (i.e. X direction in FIG. 2) in a display face (i.e. XY plane) of the display unit 12, perpendicular to the rotating axis direction (i.e. Y direction) of the first contact portion.

Further, as shown in FIG. 2, in this preferred embodiment, the cross section (see side face 103 in FIG. 2) of the first contact portion 10 perpendicular to its rotating axis direction (i.e. Y direction) is wedge-shaped. Accordingly, the cross section (see the side face 203 in FIG. 2) of the second contact portion 20 may be wedge-shaped. Herein, the cross section of the second contact portion refers to a cross section of the second contact portion cut along a plane perpendicular to the rotating axis of the first contact portion when the input body is assembled to the main body. Thus, in this preferred embodiment, the engagement between the first contact portion 10 of wedged-shape and the second contact portion 20 of wedged-shape can maximize the contact area, thereby facilitating a stable connection.

With this, in the present disclosure, when the input body 2 is not assembled to the main body 1, the first contact portion 10 can serve as a support for the main body to support the main body 1 on a support platform, by rotating the first contact portion 10 with respect to the display unit 12 to a certain angle. When the input body 2 is assembled to the main body 1, the input body 2 can not only function as an input device, but also function as a support of the electronic device to support electronic device on a support platform, by rotating the display unit 2 with respect to the input body 2 to a certain angle. In this case, position of the center of gravity may be properly designed so as to realize steady support for the main body without tipping over.

Figure 4:
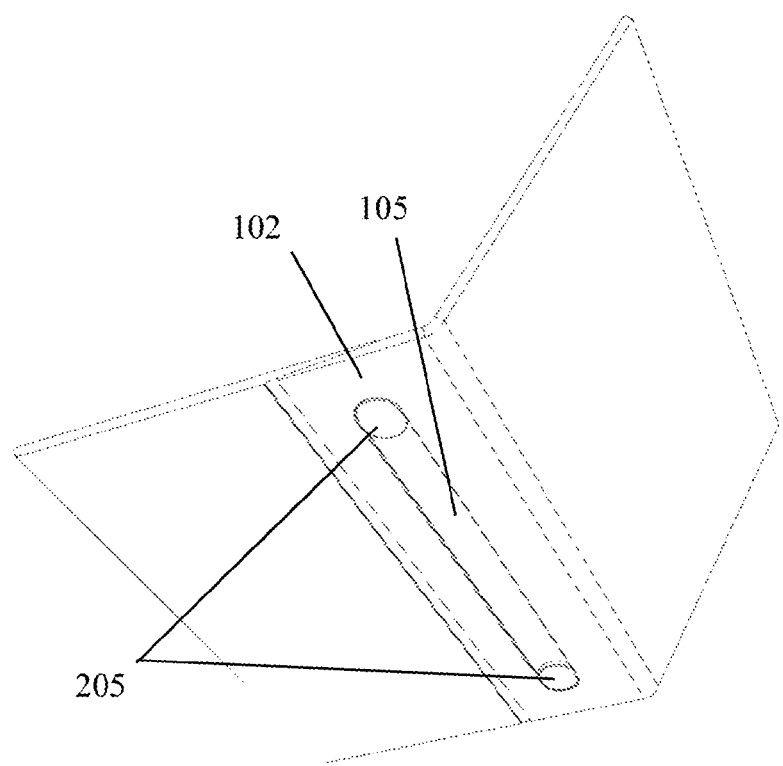
FIG. 4 is a 3D perspective view of the electronic device shown in FIG. 1, wherein the main body and the input body of the electronic device are in a state of being engaged with each other.
Figure 5:
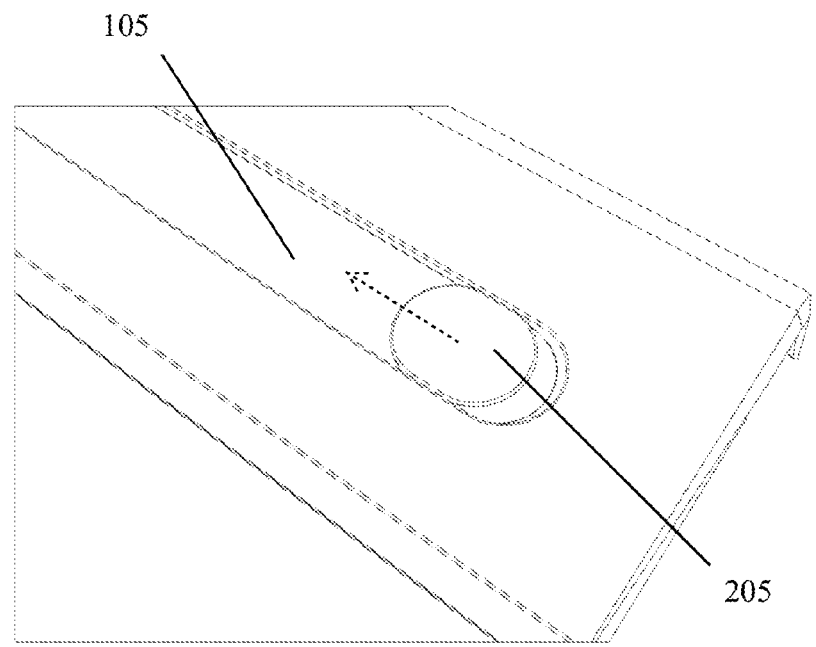
FIG. 5 is a partial enlarged view of the electronic device shown in FIG. 4, which shows the cooperation between the positioning hole of the first contact portion and the positioning projection of the second contact portion of the electronic device.
Figure 6:
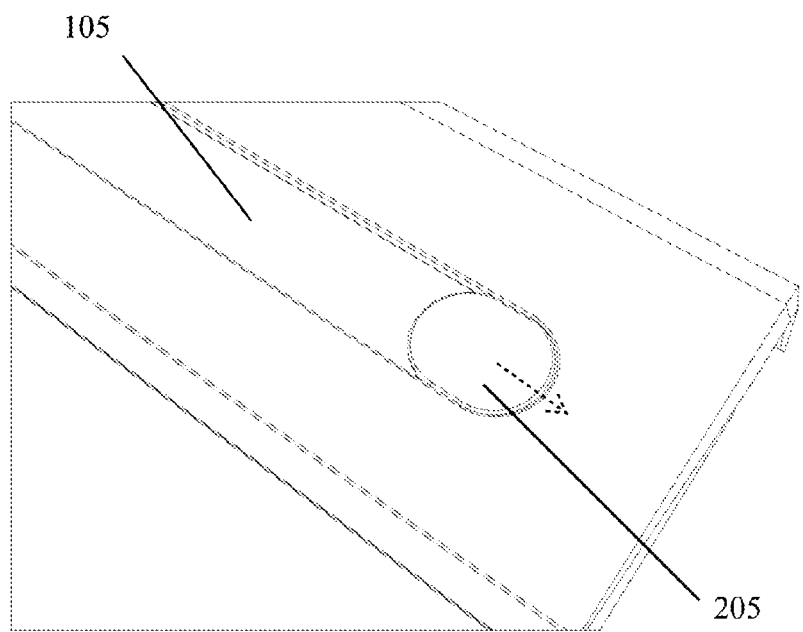
FIG. 6 is a partial enlarged view of the electronic device shown in FIG. 4, which shows the cooperation between the positioning hole of the first contact portion and the positioning projection of the second contact portion of the electronic device.

Referring now to FIGS. 4-6 describing how to achieve the engagement between the first contact portion 10 and second contact portion 20 in a preferred embodiment of the present disclosure, wherein FIG. 4 is a 3D perspective view of the electronic device shown in FIG. 1, wherein the main body and the input body of the electronic device are engaged together; FIG. 5 is a partial enlarged schematic view of the electronic device shown in FIG. 4, which shows the cooperation/fitting between the positioning hole on the first contact portion and the positioning projection on the second contact portion of the electronic device; and FIG. 6 is a partial enlarged schematic view of the electronic device shown in FIG. 4, which shows the cooperation/fitting between the positioning hole on the first contact portion and the positioning projection on the second contact portion of the electronic device.

Referring to FIG. 4, a positioning hole 105 (the shape of the positioning hole 105 can be more clearly seen in FIG. 1) is formed on the first contact portion 10, which is an elongated through-hole in this preferred embodiment; and a positioning projection 205 is formed on the second contact portion 20, which is formed as two positioning posts with an adjustable (able to be increased or decreased) spacing in-between in this preferred embodiment. When the first contact portion engages with the second contact portion, the positioning projection 205 is inserted into the positioning hole 105 to realize a fixed connection between the main body and the input body. More specifically, referring to FIG. 5, the spacing between the two positioning posts 205 is reduced first (i.e., the positioning post 205 shown in FIG. 5 is moved to the left along a direction shown by the arrow), so that the two positioning posts 205 can be easily inserted into the elongated through-hole 105, and then, referring to FIG. 6, the spacing between the two positioning posts is increased (i.e., the positioning post 205 shown in FIG. 5 is moved to the right along a direction shown by the arrow), so that the two positioning posts 205 are respectively locked or snapped at both ends of the elongated through-hole 105, enabling fixed connection between the main body and the input body. Preferably, the positioning post 205 may have a return spring attached thereto so as to automatically increase the spacing between the two positioning posts after the positioning posts being inserted into the positioning hole by means of restoring force of the return spring, such that the two positioning posts can be locked or snapped respectively at two ends of the elongated through-hole.

It should be noted that, FIGS. 4-6 merely show a preferred embodiment that the second contact portion of the input body is fixed onto the first contact portion of the main body, but the present disclosure is not limited thereto. For example, the positioning projection may be located on the first contact portion instead of the second contact portion, and accordingly, the positioning hole is located on the second contact portion instead of the first contact portion. However, the embodiment illustrated in FIGS. 4-6 is more preferred because in this embodiment, the through-hole of the first contact portion can also function as a handle or grip portion of the main body such that the user may put his/her fingers into the positioning hole to stably grip and carry the main body. In addition, alternatively, the first and second contact portions may be fixed not by the positioning projection/the positioning hole, but for example by bonding, such as suing Velcro tape, detachably.

It is noted that, as described above, in the above-described product of the present disclosure, the main body may be used independent of the input body; therefore, it is possible not to provide the input body, but only provide a main body as described above. For example, the present disclosure also provide an electronic device which is provided with said main body but not provided with said input body, and the main body comprises a display unit and a first contact portion connected to the display unit to rotate with respect to the display unit, wherein the first contact portion has a first surface and a second surface opposite to the first surface, the display unit has a display face and a back face opposite to the display face, and at least a part of the first contact portion has a thickness, measured in a direction perpendicular to the display face, smaller than the thickness of the display unit in a situation that the first contact portion is rotated to a position wherein the first or the second surface is in a same plane with the back face or parallel to the back face, and wherein the first or second surface of the first contact portion may be used to engage with the contact surface of another electronic device in a manner of surface-to-surface contacting to detachably assemble the electronic device with another electronic device, and wherein, the first contact portion can also function as a support for the electronic device to support the electronic device on a support platform.

Finally, it should be noted that, although in the above various embodiments, the present disclosure has been described in the specification and is illustrated in the accompanying drawings, those skilled in the art will appreciate that the above-described embodiments are merely preferred embodiments, and some technical features in the embodiments may be not necessary to address specific technical problem, which can be removed or omitted without affecting the solution to technical problems; also, features, elements and/or functions of one embodiment can be combined, composited, cooperated with features, elements and/or functions of one or more other embodiments, unless the combination, composition or cooperation cannot be implemented.

The invention claimed is:

1. An electronic device, comprising:
    a main body that includes a display unit and a first contact portion rotatably connected to the display unit, wherein the first contact portion comprises a first surface and a second surface opposite to the first surface, and a cross section of the first contact portion perpendicular to a rotating axis thereof is wedge-shaped wherein a distal portion has a thickness smaller than a thickness of a proximal portion; and
    an input body that is detachably connected to the main body and that includes a second contact portion with a contact surface, wherein a cross section of the second contact portion is wedge-shaped, such that the cross section of the second contact portion is a cross section cut in a direction perpendicular to the rotating axis of the first contact portion when the input body is assembled to the main body,
    wherein, when the input body is connected to the main body, the display unit rotates with respect to the input body, and the contact surface of the second contact portion engages with the first or second surfaces of the first contact portion by surface-to-surface contact, wherein when the input body is connected to the main body a distal portion of the input body has a thickness greater than a thickness of a proximal portion.

2. The electronic device according to claim 1, wherein, when the first contact portion is engaged with the second contact portion, a thickness of overlapping parts of the first and second contact portions is smaller than or equal to the thickness of the display unit.

3. The electronic device according to claim 1, wherein the first contact portion is connected to the display unit by a rotating connector.

4. The electronic device according to claim 3, wherein, in a direction perpendicular to a rotating axis of the rotating connector, the first contact portion has a length shorter than that of the display unit.

5. The electronic device according to claim 1, wherein, in at least one position, the first contact portion supports the main body on a supporting platform when the input body is detached from the main body.

6. The electronic device according to claim 1, wherein, in at least one position, the input body supports the electronic device on a supporting platform when the input body is assembled to the main body.

7. The electronic device according to claim 6, wherein, the input body is rotatable with respect to the main body from 0° to 360°.

8. The electronic device according to claim 7, wherein, when the input body is assembled to the main body, the input body rotates with respect to the main body at a predefined angle, so that the input body is lying on a supporting platform to support the electronic device, or an edge of the input body and an edge of the main body are contacting the supporting platform to support the electronic device.

9. The electronic device according to claim 1, wherein the second contact portion is an edge portion of a housing of the input body.

10. The electronic device according to claim 1, further comprising a positioning hole formed on the first contact portion and a positioning projection formed on the second contact portion, the positioning projection cooperatively engages the positioning hole to fix the input body with the main body.

11. The electronic device according to claim 10, wherein, the positioning hole is formed as an elongated through-hole, and the positioning projection is formed into two positioning posts with adjustable spacing, the spacing between the two positioning posts is reduced so that the two positioning posts cooperatively engage the elongated through-hole, and the spacing is increased thereafter so that the two positioning posts are locked onto two ends of the elongated through-hole, respectively.

12. The electronic device according to claim 11, further comprising a spring attached to the positioning posts to automatically increase the spacing between the two positioning posts after the two positioning posts are inserted into the positioning hole.

13. The electronic device according to claim 1, wherein the main body is tablet computer.

14. The electronic device according to claim 1, wherein the input body is a keyboard.

15. An electronic device having a main body that comprises:
    a display unit; and
    a first contact portion coupled to the display unit and rotatable with respect to the display unit, wherein the first contact portion includes a first surface and a second surface opposite to the first surface, and a cross section of the first contact portion perpendicular to a rotating axis thereof is wedge-shaped wherein a distal portion has a thickness smaller than a thickness of a proximal portion;
    wherein the first or second surface of the first contact portion detachably engages with a contact surface of a second electronic device by surface-to-surface contacting and, in at least one position, the first contact portion supports the electronic device on a supporting platform and wherein a cross section of the second electronic device is wedge-shaped, such that the cross section of the second electronic device is a cross section cut in a direction perpendicular to the rotating axis of the first contact portion and such that a distal portion of the second electronic device has a thickness greater than a thickness of a proximal portion when the second electronic device is assembled to the first contact portion.

* * * * *